(12) United States Patent
Choi et al.

(10) Patent No.: US 11,188,820 B2
(45) Date of Patent: Nov. 30, 2021

(54) DEEP NEURAL NETWORK PERFORMANCE ANALYSIS ON SHARED MEMORY ACCELERATOR SYSTEMS

(71) Applicant: International Business Machines Corporation, Armonk, NY (US)

(72) Inventors: Jungwook Choi, Yorktown Heights, NY (US); Vijayalakshmi Srinivasan, Yorktown Heights, NY (US); Swagath Venkataramani, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 761 days.

(21) Appl. No.: 15/699,320

(22) Filed: Sep. 8, 2017

(65) Prior Publication Data

US 2019/0080232 A1    Mar. 14, 2019

(51) Int. Cl.
*G06N 3/08* (2006.01)

(52) U.S. Cl.
CPC ..................... *G06N 3/08* (2013.01)

(58) Field of Classification Search
CPC ................. G06N 3/08; G06N 20/00
See application file for complete search history.

(56) References Cited

U.S. PATENT DOCUMENTS

| 8,504,361 | B2 | 8/2013 | Collobert et al. |
| 9,262,724 | B2 | 2/2016 | Kingsbury et al. |
| 9,292,789 | B2 | 3/2016 | Shiv |
| 9,324,321 | B2 | 4/2016 | Xue et al. |
| 9,454,714 | B1 | 9/2016 | Ibarz et al. |
| 9,668,699 | B2 | 6/2017 | Georgescu et al. |
| 9,760,827 | B1* | 9/2017 | Lin ............ G06N 3/04 |
| 10,534,994 | B1* | 1/2020 | Kaul .............. G06N 3/084 |
| 2007/0022063 | A1* | 1/2007 | Lightowler ...... G06N 3/063 706/15 |
| 2007/0277130 | A1* | 11/2007 | Lavelle ........ G01R 31/318314 716/107 |
| 2009/0106012 | A1* | 4/2009 | Liu ............... H04L 63/20 703/21 |
| 2011/0029471 | A1* | 2/2011 | Chakradhar ........ G06N 3/063 706/25 |
| 2011/0219208 | A1* | 9/2011 | Asaad ............... G06F 9/06 712/12 |
| 2012/0081373 | A1* | 4/2012 | Li ................. G06F 1/329 345/520 |

(Continued)

OTHER PUBLICATIONS

Wirthlin et al. (Improving Functional Density Using Run-Time Circuit Reconfiguration, Jun. 1998, pp. 247-256) (Year: 1998).*

Zhang et al. (Optimizing FPGA-based Accelerator Design for Deep Convolutional Neural Networks, Feb. 2015, pp. 161-170) (Year: 2015).*

(Continued)

*Primary Examiner* — George Giroux
(74) *Attorney, Agent, or Firm* — Peter Edwards, Esq.; McGinn I.P. Law Group, PLLC.

(57) ABSTRACT

A Deep Neural Networks (DNN) analysis method, system, and computer program product include characterizing a space of possible configurations for a DNN, evaluating a metric-of-interest for a configuration of the possible configurations, and searching the space to identify a configuration of the possible configurations that maximizes the metric-of-interest.

20 Claims, 12 Drawing Sheets

(56) References Cited

U.S. PATENT DOCUMENTS

| | | | | |
|---|---|---|---|---|
| 2015/0120632 | A1* | 4/2015 | Campos | G06N 3/082 |
| | | | | 706/44 |
| 2016/0147516 | A1* | 5/2016 | Rajnak | G06F 16/2455 |
| | | | | 717/150 |
| 2016/0239706 | A1 | 8/2016 | Dijkman et al. | |
| 2016/0321777 | A1* | 11/2016 | Jin | G06N 3/0454 |
| 2016/0379115 | A1 | 12/2016 | Burger et al. | |
| 2017/0011117 | A1* | 1/2017 | Jiang | G06F 40/253 |
| 2017/0103316 | A1 | 4/2017 | Ross et al. | |
| 2017/0132496 | A1 | 5/2017 | Shoaib et al. | |
| 2017/0162194 | A1 | 6/2017 | Nesta et al. | |
| 2017/0169332 | A1 | 6/2017 | Graves et al. | |
| 2017/0249387 | A1* | 8/2017 | Hatami-Hanza | G06F 16/951 |
| 2017/0261949 | A1* | 9/2017 | Hoffmann | G05B 13/0265 |
| 2018/0052693 | A1* | 2/2018 | Sankaralingam | G06F 12/084 |
| 2018/0181501 | A1* | 6/2018 | Stark | G06F 12/0238 |
| 2018/0211155 | A1* | 7/2018 | Bazrafkan | G06N 3/082 |
| 2018/0232639 | A1* | 8/2018 | Lin | G06N 3/08 |
| 2019/0018815 | A1* | 1/2019 | Fleming | G06F 13/423 |

OTHER PUBLICATIONS

Bergstra et al. (Random Search for Hyper-Parameter Optimization, Feb. 2012, pp. 281-305) (Year: 2012).*

Ma et al. (Optimizing Loop Operation and Dataflow in FPGA Acceleration of Deep Convolutional Neural Networks, Feb. 2017, pp. 45-54) (Year: 2017).*

Mel, et al. "The NIST Definition of Cloud Computing". Recommendations of the National Institute of Standards and Technology. Nov. 16, 2015.

Sharma et al.; "From High-Level Deep Neural Models to FPGAs", MICRO Annual IEEE/ACM International Symposium on, Oct. 15-19, 2016, pp. 1-12.

Ganapathy et al.; "DyVEDEEP: Dynamic Variable Effort Deep Neural Networks", Cornell University Library, arXiv:1704.01137v1, Apr. 4, 2017, pp. 1-16.

Shen et al.; "MCDNN: An Execution Framework for Deep Neural Networks on Resource-Constrained Devices", University of Washington and Microsoft Res., Dec. 2014, pp. 1-17.

Judd et al.; "Proteus: Exploiting Numerical Precision Variability in Deep Neural Networks", ICS'16 ACM International Conference on, Article 23, Jun. 1-3, 2016, pp. 1-6.

* cited by examiner

FIG. 2

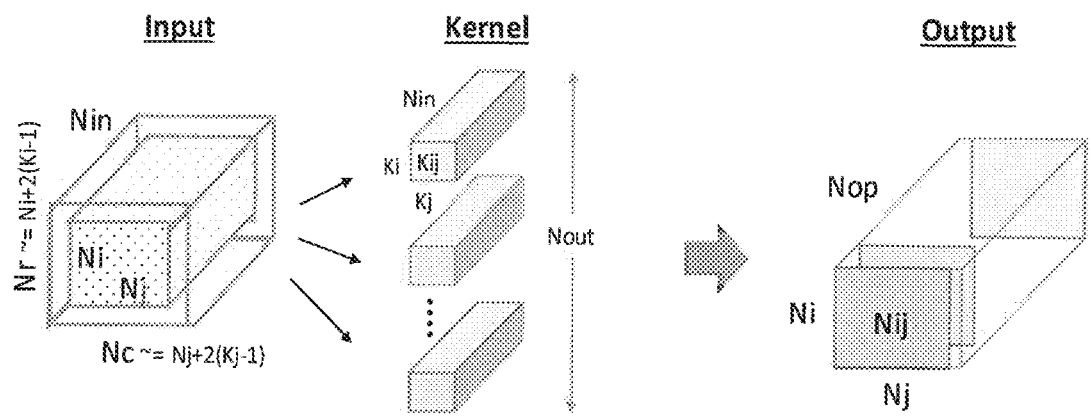

Possible dimensions to partition CONV layer:
(i) in → Along input features
(ii) op → Along output features
(iii) ij → Along feature dimension
(iv) kij → Along kernel dimension
(v) mb → Along minibatch samples Given a configuration tuple <in, op, ij, kij, mb>:
Size of each data structure
(i) Inp = in * ij * mb → Input feature size
(ignoring zero padding, assuming stride = 1)
(ii) Out = op * ij * mb → Output feature size
(iii) Ker = in * op * kij → Kernel weights
Total scalar operations
OPS = in * out * ij * kij * mb

FIG. 8(a)-(d)
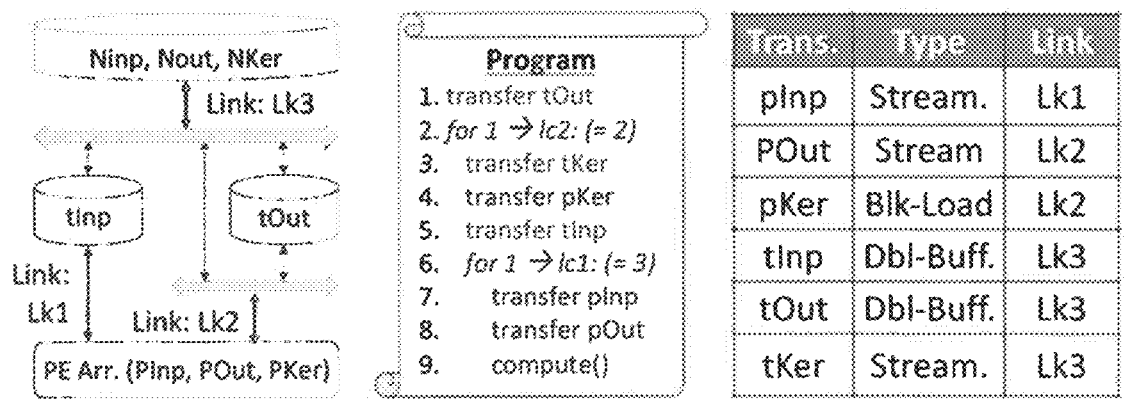
(a) Architecture  (b) Code Snippet  (c) Data-transfers
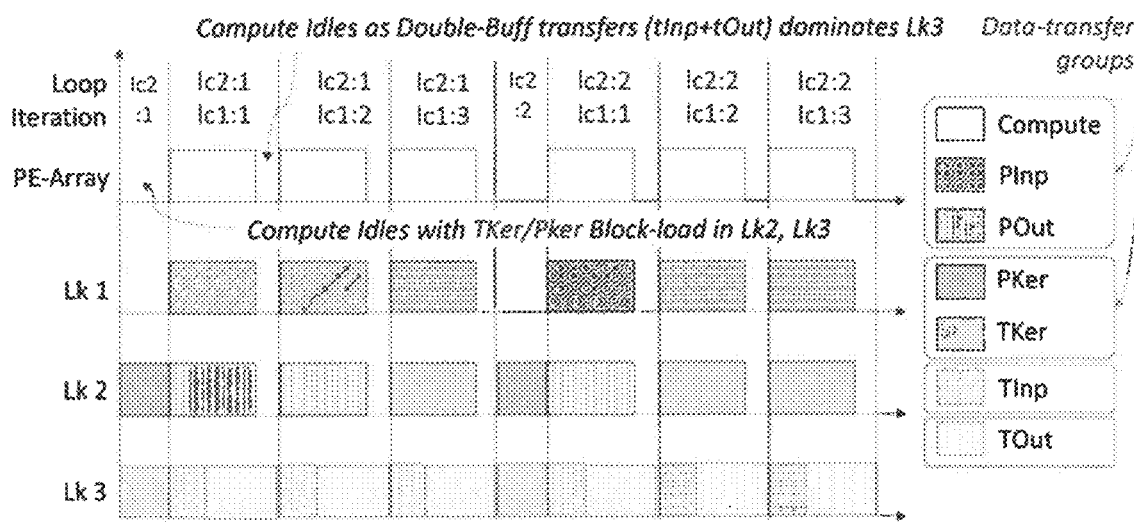
(d) DSC Timing Waveform

DEEP NEURAL NETWORK PERFORMANCE ANALYSIS ON SHARED MEMORY ACCELERATOR SYSTEMS

BACKGROUND

The present invention relates generally to a Deep Neural Networks (DNNs) analysis method, and more particularly, but not by way of limitation, to a system, method, and computer program product for systematically exploring the design space so as to estimate a given DNN's performance on a shared memory architecture specification using a variety of data flows.

Conventionally, DNNs have advanced the state-of-the-art in a variety of machine learning tasks, and have emerged as a powerful and versatile class of methods showing successes on challenging artificial intelligence (AI) problems. Applications in domains such as image/video processing, natural language processing, speech synthesis and recognition have embraced deep learning as the foundation. DNNs achieve accuracy for these applications with high computational complexity using very large models, which require hundreds of MBs of data storage, and high bandwidth for data movement.

Although the dominant DNN operations benefit from parallel compute paradigms, the challenges in meeting both the throughput and the energy efficiency goals have led to explorations of specialized accelerators for DNNs. Conventionally, several specialized data-flows and architectures have been proposed using various hardware platforms such as Field programmable gate array (FPGA), Coarse-grained reconfigurable array (CGRA), and Applicant-specific integrated circuit (ASIC). Each of these data-flows and architecture platforms provide a data point for energy and throughput of the DNNs studied. However, a direct comparison between different implementations is not possible due to variations in the implementing technology, data-flow mapping, the hardware architecture and the available data storage.

SUMMARY

In an exemplary embodiment, the present invention can provide a computer-implemented Deep Neural Networks analysis method, the method including characterizing a space of possible configurations for a deep neural network (DNN), evaluating a metric-of-interest for a configuration of the possible configurations, and searching the space to identify a configuration of the possible configuration that maximizes the metric-of-interest. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily shows parameters of a convolutional layer;

FIGS. 8(a)-8(d) exemplarily depicts a timing of a DSC tuple;

DETAILED DESCRIPTION

Figure 1:
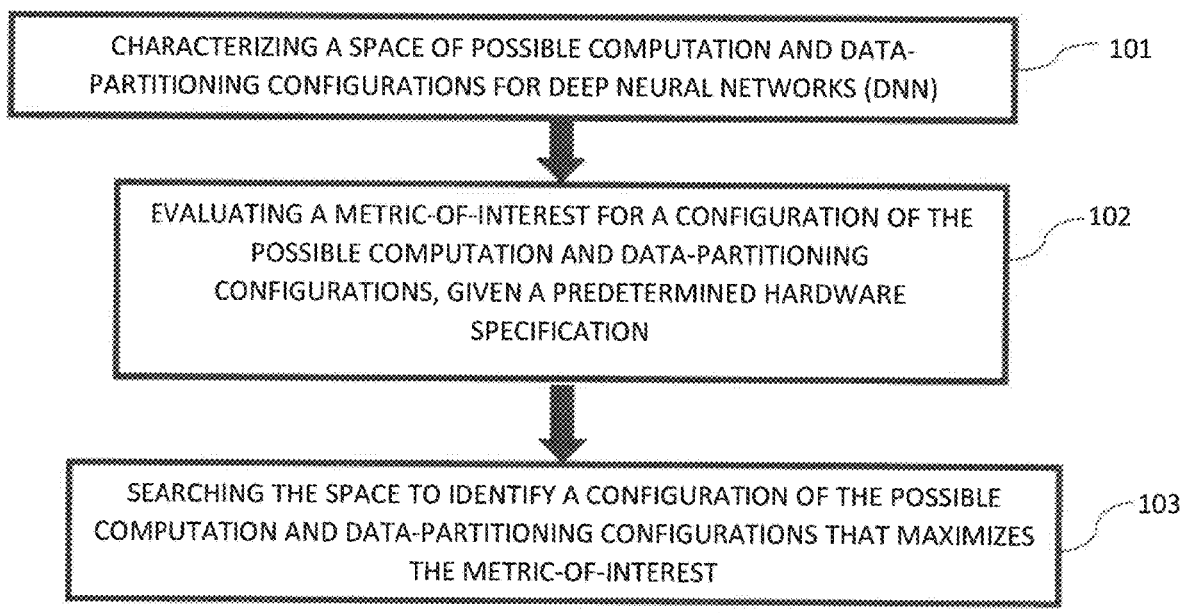
FIG. 1 exemplarily shows a high-level flow chart for a Deep Neural Networks analysis method 100 according to an embodiment of the present invention.

Embodiments of the invention are directed to a systematic exploration of the design space to be able to estimate a given Deep Neural Network's performance on any given shared memory processor architecture using a variety of different data flows.

The invention will now be described with reference to FIGS. 1-13, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a DNN analysis method 100 according to the present invention can include various steps which takes inputs of a description of a DNN, and a target hardware architecture containing multiple accelerator cores, an on-chip memory hierarchy with private and shared memories, and an on-chip interconnect network to systematically explore a design space of how to compute and data can be partitioned and mapped to the different processor and memory elements, such that overall system-level performance is maximized, while meeting the constraints imposed by the architecture.

Figure 11:
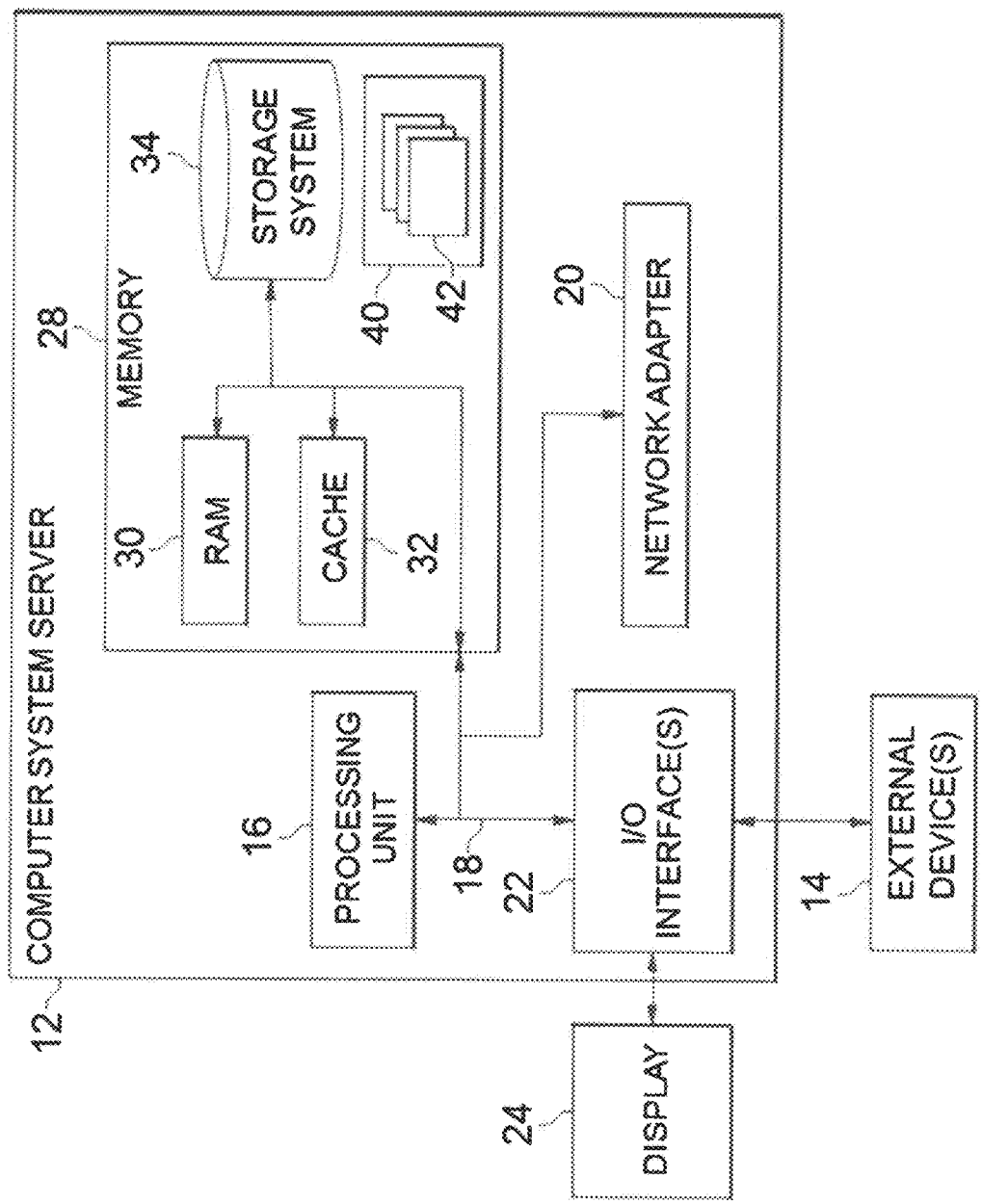
FIG. 11 depicts a cloud-computing node 10 according to an embodiment of the present invention.

By way of introduction of the example depicted in FIG. 11, one or more computers of a computer system 12 according to an embodiment of the present invention can include a memory 28 having instructions stored in a storage system to perform the steps of FIG. 1.

Referring generally to the invention, DNNs are composed of primitive computing units called "neurons" that are organized in layers. A class of DNNs, Feed-forward DNNs, in which each layer of neurons is connected only to neurons in the layer succeeding it. Each layer is associated with a set of parameters called "weights". Each neuron is a many-input, one-output function that computes the dot product of its incoming connections and corresponding weights, followed by a non-linear activation function. DNNs are operated in two phases: (i) Training/Learning, in which the weights and other parameters associated with the DNN are learned, and (ii) Inference/Evaluation, in which the trained DNN is deployed and used to classify new inputs.

Regarding the training and evaluation, in the training phase, a training dataset pre-labelled with golden class outputs ($G^{LN}$) for each training input is used to learn the parameters of the DNN. The weights of the DNN are initialized randomly, and iteratively refined using the Stochastic Gradient Descent (SGD) algorithm. DNN training may include, for example, three steps.

A first step, Forward Propagation (FP), in which for each training input, the neurons in each layer are evaluated successively as a function of its inputs and weights (W), until the outputs of the DNN are reached. The output of neurons in each layer, are as known as its feature activations ($Act^{Li}$ for layer Li), are preserved. A second step, Back-propagation (BP), in which the difference between the DNN output ($Act^{LN}$) and the golden output ($G^{LN}$) is computed for the training image to find the error or delta-activation ($dAct^{LN}$) at the output of the DNN. The $dAct^{LN}$ is propagated back through the DNN to apportion the output error to errors at neurons in each layer ($dAct^{Li}$). In a third step, a Weight Gradient (WG) is determined, in which finally, the feature activations ($Act^{Li}$) and delta-activations ($dAct^{Li}$) for each layer are used to identify delta-weights ($dW^{Li}$), i.e., the amount by which the weights of the layer need to be modified.

Typically, the weights of the DNN are not updated for every training input. Instead, multiple training inputs are grouped to form a minibatch. The dWs for each training image in a minibatch are accumulated and the DNN weights are updated at the end of the minibatch. Since there is a sequential dependency between neurons of one layer to the next layer, the parallelism in realizing the FP/BP/WG steps is limited to the computations in a given layer for all the minibatch images.

In the case of inference, only the forward propagation (FP) step is performed to evaluate the DNN outputs for a given input. The input is labelled as the class corresponding to the neuron with the largest activation.

The computations performed within each step (FP/BP/WG) for a given layer, depends on the layer type, which is broadly defined by how the neurons are connected to the layer's inputs. DNNs typically include the following three types of layers.

A first layer of "Convolutional Layers (CONV)", in which, in CONV layers, neurons are organized into multiple 2D grids called features. FIG. 2 shows a CONV layer in which the input is organized as Nin features, each of size Ni×Nj (Nij). The layer produces Nop output features, each typically of the same size as the input (Nij). In the case of FP, each output feature is produced by convolving all the Nin input features with weight kernels of size Nki×Nkj (Nkij). The input features are typically zero-padded to match the convolved output feature dimensions. Given a minibatch size of Nmb, FIG. 2 shows the sizes of the input (Inp), output (Out) and kernel (Ker) data-structures, and the total number of multiply-and-accumulate operations required to evaluate the layer. Thus, in the invention, the CONV layers are represented succinctly using a 5-dimension tuple—N{in, op, ij, kij, mb}, representing the input features, output features, feature dimensions, kernel dimensions, and minibatch samples respectively. In some cases, a connection table representing which input features are connected to each output feature, and a convolution stride are also specified. It is noted that the BP and WG steps can also be formulated as convolution operations, and represented using the N{in, op, ij, kij, mb} tuple by appropriately modulating the dimensions. For example, in the case of BP, the Nop and Nin dimensions are swapped as the dActs are propagated back from the output to the input of the layer. Similarly, in the case of WG, the Nin and Nmb, and Nij and Nkij are swapped.

A second layer of "Fully-connected Layers (FC)" is provided, in which, in the FC layers, the neurons are arranged as a 1D vector, and each neuron is connected to all the layer's inputs. The FC layers are a special case of the CONV layers, where the feature dimensions are 1×1. The 5-dimensional tuple is used to represent the CONV layers, can be specialized to N{in, op, 1, 1, mb} in the context of the FC layers, where Nin and Nop denote the number of input and output neurons and Nmb denotes the minibatch size. In contrast to CONV layers, FC layers account for <5% of the compute operations, but are predominantly memory dominant and amount to >80% of the DNN model size.

A third layer of "Pooling Layers (POOL)" is provided, in which, POOL layers follow some of the CONV layers in DNNs. Input features to POOL layers are divided into non-overlapping regions, which are sampled (Max/Average) to produce outputs of reduced feature dimensionality. Since POOL layers involve only a local transformation of a small number of inputs (2×2 or 3×3), they are typically coupled with the CONV layers they follow. Therefore, in the invention, the POOL layers are analyzed in conjunction with the CONV layers.

With reference now to FIG. 1, the method 100 includes various steps to develop a systematic framework to analyze the performance of DNNs on systems with one or more accelerator cores. The framework of the method takes a description of the DNN (similar to Caffe/Tensor flow input), and the parameters of the hardware architecture (e.g., number of cores) as its inputs. The framework includes a library of data-flows that maps DNN computations onto the hardware architecture. The framework optimizes how best the DNN can be mapped onto the hardware architecture (i.e., how the computations need to be partitioned amongst the processing elements, how much data needs to be staged in each memory and how the data movement needs to be orchestrated across the links, etc.—to maximize performance while meeting the hardware constraints).

Figure 3:
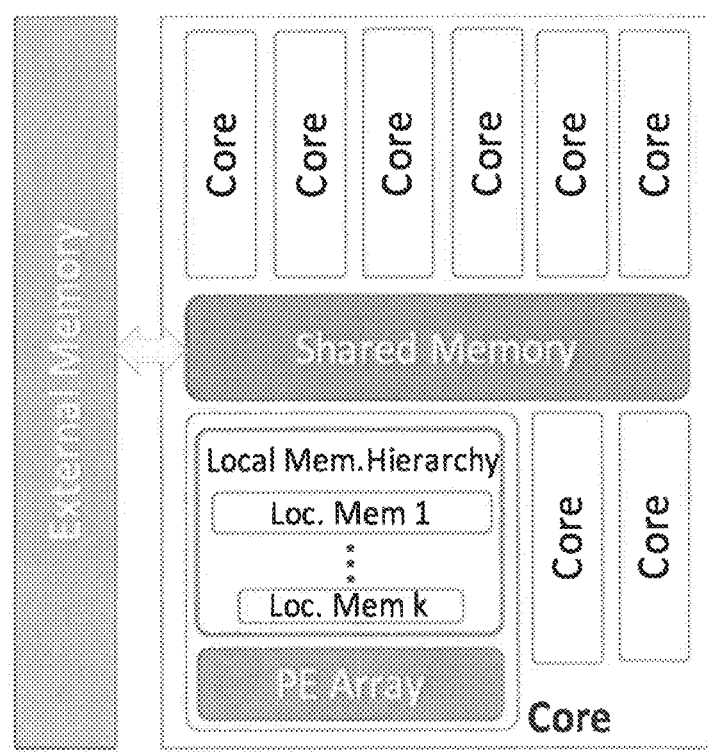
FIG. 3 exemplarily depicts a generic, configurable shared-memory accelerator architecture template.

Referring generally to FIG. 3, FIG. 3 depicts a generic, configurable shared-memory accelerator architecture template for the method 100. The architecture includes several accelerator cores and a shared memory, which are interfaced to an external memory. The shared memory can be bypassed (i.e., data can be fed to cores without staging them first in the shared memory). Each core includes a processing element (PE) array with several scalar processing elements and corresponding local register files. It is noted that the invention does not make any assumptions on how the processing elements are interconnected within the PE array. The core also contains a local memory hierarchy, through which data is fed to the PE array. Although, the invention is applicable to designs with any number of levels in its local memory hierarchy, for the case of explanation, the embodiments described herein include the number of level in the hierarchy being 2. The levels are labeled as the L1 and L2 memories, respectively. Similar to the shared memory, the L1 and L2 memories can also be bypassed.

The method 100 utilizes the following parameters to customize the aforementioned architectural template of FIG. 3. First, "Compute Parameters" is provided, in which the parameters used to configure the compute units are:

- Number of cores ($N_{cores}$)
- Word length (WL) of data-structures
- For each dataflow in DEEPMATRIX, the minimum quantum of work in each {in, out, ij, kij, mb} dimension expected by the PE array to function at peak utilization ($P_{pref}$\{in, op, ij, kij, mb\})
- Given any quantum of work to the PE array (P{in, out, ij, kij, mb}), the amount of execution cycles it takes to complete execution (P_exCycles=f(P{in, op, ij, kij, mb}))

Through the $P_{pref}$ and P_exCycles parameters, the method 100 abstracts the details of how the PEs and register files are organized within the PE array, thereby enhancing its generality.

Second, "Memory Parameters" are utilized in which, for each memory hierarchy level, the number of memory structures and the capacity of each memory structure are defined.

And, a third parameter, "Interconnect Parameters", in which the interconnect topology is encapsulated in the invention using the bandwidth of each data link within the cores and the average bandwidth from each core to the external and shared memories and other cores in the system.

Referring back to FIG. 1, in Step 101, a space of possible configurations, such as computation and data-partitioning configuration for a deep neural network (DNN) is characterized. That is, given the architectural template, the design space is formulated of possible configurations to realize DNN layers on the architecture. As described above, the workload associated with each step (FP/BP/WG) of a given layer can be represented using a 5-dimensional tuple N {in, op, ij, kij, mb}, and involves three different data-structures viz. input (Inp—Nin×Nij×Nmb), output (Out—Nop×Nij×Nmb) and kernel (Ker—Nin×Nop×Nkij). As exemplarily depicted in FIG. 4, it is assumed that the input and kernel data is present in the external memory, which needs be fetched and processed by the accelerator cores, and the output is stored back. The design space formulation comprises of 48 parameters, clustered into three parameter groups, which are described below.

The data present in the external memory (N{in, op, ij, kij, mb}) needs to pass through several levels in the memory hierarchy before reaching the PE array within the cores. The data-staging parameters represent the amount of data stored at each memory level.

Figure 4:
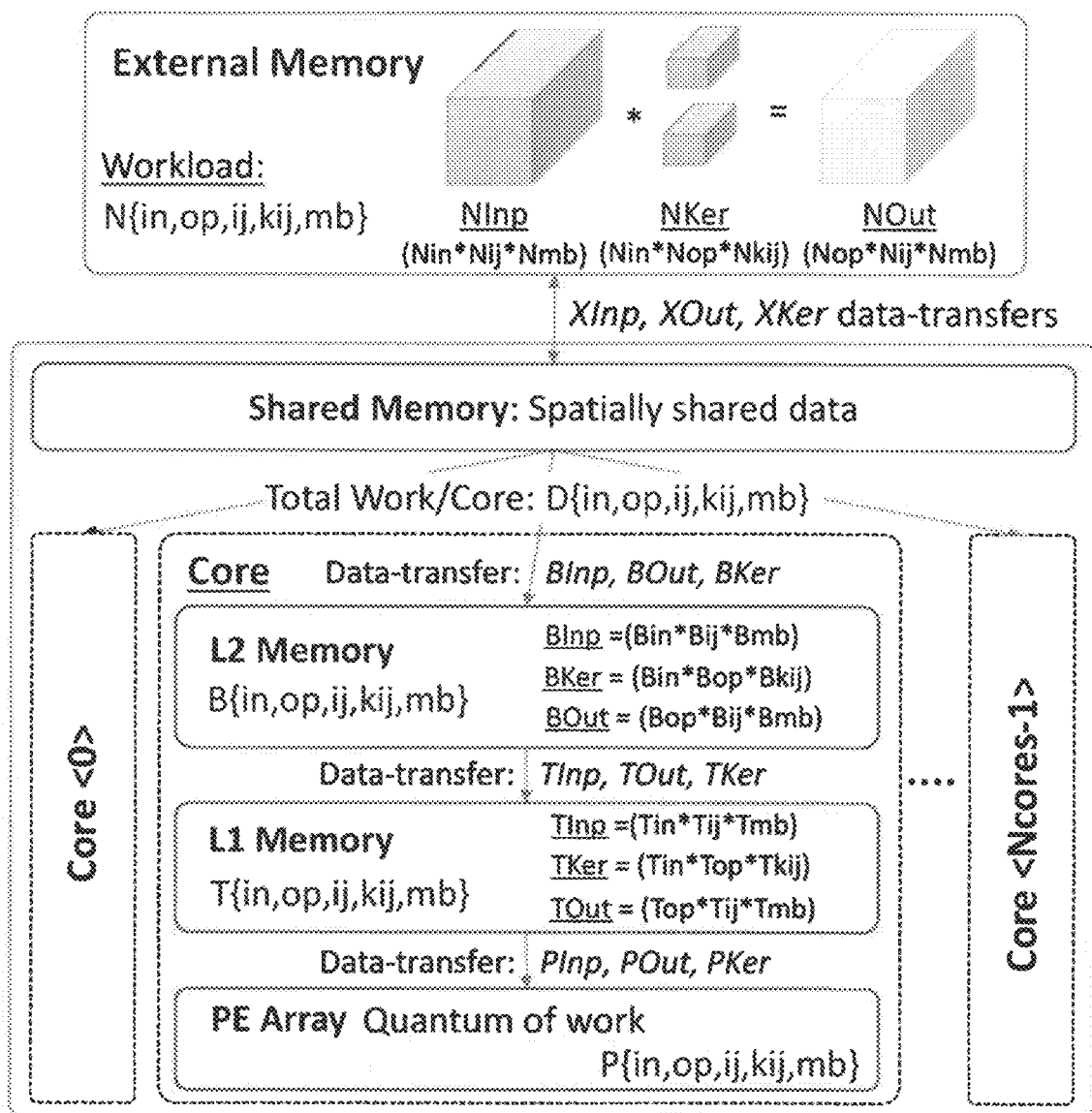
FIG. 4 exemplarily depicts data-staging parameters and data transfers.

At the topmost level, the work associated with the N tuple needs to be distributed amongst the different cores. To maximize performance, work preferably should be equally distributed amongst the cores. The data corresponding to the work allocated to each core is denoted using the division D{in, op, ij, kij, mb} parameters as depicted in FIG. 4. It is noted that based on the values of D, some amount of data may be shared between the cores. Such data structures are stored in the shared memory. The data exclusive to each core are directly fed, bypassing the shared memory.

With D amount of work assigned to each core, the PE array within the core iteratively works on a quantum of P {in, op, ij, kij, mb} data at a time. P is typically constrained by how the PEs are organized within the PE array and the capacity of their local register files. Note that a preferred value of P (Ppref) that maximizes PE array utilization is provided as an input to the method 100. Next, each level of the core's local memory hierarchy stores a progressively bigger chunk of data to enhance data reuse. The data stored in the L1 and L2 memories is denoted as tiles (T{in, op, ij, kij, mb}) and blocks (B{in, op, ij, kij, mb}) respectively.

Thus, in Step 101, the design space includes of 20 data-staging parameters viz. P/T/B/D{in, op, ij, kij, mb}. These parameters denote the quantum of data processed by the PE array (P), data stored in the L1 (T) and L2 (B) memories, and the work assigned to each core.

Figure 5:
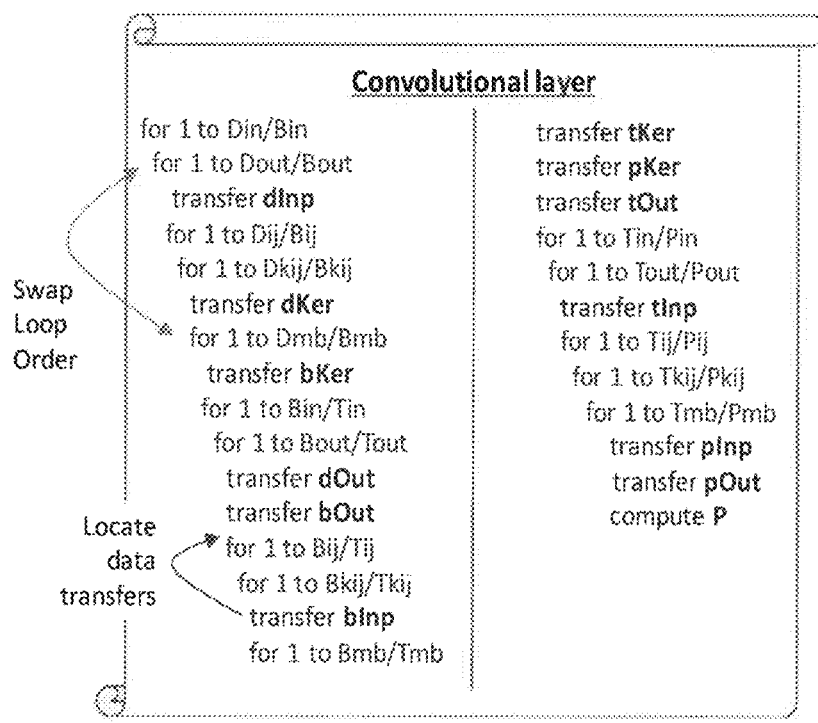
FIG. 5 exemplarily depicts pseudocode to realize computation of a layer.

With the above data-staging parameters in place, each core needs to execute 15 nested loop iterations, as shown in FIG. 5, to complete all computations constituting the layer. The computation is performed within the innermost loop in quanta of P. The loops can be clustered into three stages viz. (T/P), (B/T) and (D/B) loops. The (T/P) loops accomplish T quantum of compute in chunks of P. The (B/T) loops perform B quantum of work in chunks of T and so on. Each loop stage includes of 5 loops, one along each {in, op, ij, kij, mb} dimension.

In addition to the computation, 12 data transfers viz. P{Inp, Out, Ker}, T{Inp, Out, Ker}, B{Inp, Out, Ker}, X{Inp, Out, Ker}, are embedded within the loops. These data transfers carry the input, output and kernel data-structures between the PE array and successive levels in the memory hierarchy. It is noted that Inp and Ker are unidirectional transfers (i.e., data is brought in to a given level of hierarchy from the next level).

However, Out is a bidirectional transfer (i.e., as previously computed partial outputs are brought in to a given level of hierarchy), more updated outputs are simultaneously stored back. Further, in Step 101, each data-transfer is allowed to be one of the following three types: (i) Double-buffered, in which the data-transfer pre-fetches data for the next computing iteration, over-lapping communication with computing, (ii) Streaming, in which the data-transfer occurs synchronously at the same time as the computing is progressing, and (iii) Block-load, in which the compute idles while the data-transfer occurs.

The order in which the loops are arranged, and the points where the data-transfers are located can affect the overall performance and capacity/bandwidth requirements. For example, moving a data-transfer above a loop increases memory capacity but simultaneously alleviates bandwidth requirement due to the increases in data reuse. Therefore, the loop order (15 parameters) and the data-transfer location (12 parameters) are included as part of the design space.

Moreover, the dataflow dictates how the computing is orchestrated within the PE array. In addition to determining the minimum granularity of work that the PE array should have in each dimension (Ppref{in, op, ij, kij, mb}) and the execution cycles that it takes to complete work (P_exCycles), the data-flow influences how the data should be fed to the PE array. For example, if the dataflow is weight stationary, then kernels are held in the local register files of the PE array (PKer is block-loaded), while the inputs (P Inp) and output (POut) are streamed. The method 100 has developed a library with two data-flows in the invention, and selects the one that is best suited for a given layer.

Figure 6:
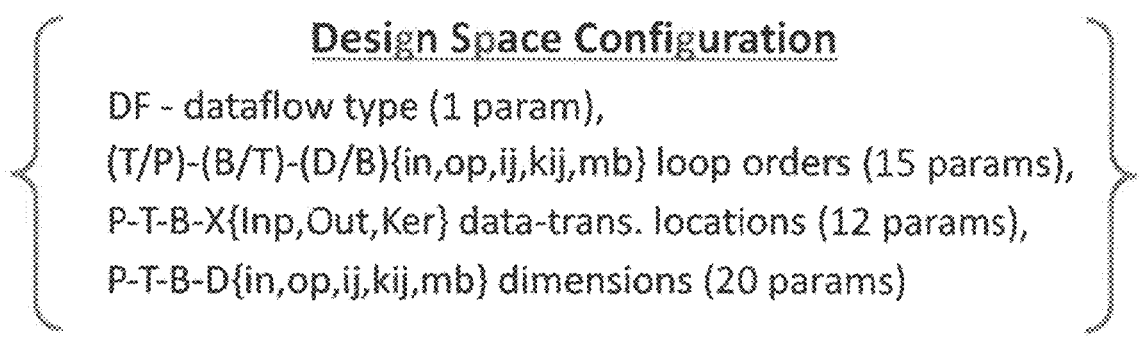
FIG. 6 exemplarily depicts a design space configuration tuple.

In addition to the multiply-and-accumulate computations associated with the N{in, op, ij, kij, mb} dimensions, the layer also contains other computations such as an activation function and/or pooling etc. These operations typically involve local transformations of the multiply-and-accumulate output (e.g., activation function is a scalar—single IO—transformation). Therefore, given a loop order, their location is fixed after a selected loop iteration in the pseudocode (e.g., line 20 in FIG. 5). It is noteworthy that auxiliary computations account for <1% of the total operations. In summary, the invention identifies a 48-parameter design space, comprised of 20 data-staging parameters, 15 loop orders, 12 data-transfer locations, and 1 dataflow choice. The Design Space Configuration (DSC) tuple is shown in FIG. 6.

In Step 102, a metric-of-interest for a configuration of the possible configurations is evaluated. That is, given a Design Space Configuration (DSC) tuple, the approach to identify if the configuration is valid, and if so evaluating its performance is performed in Step 102.

Figure 7:
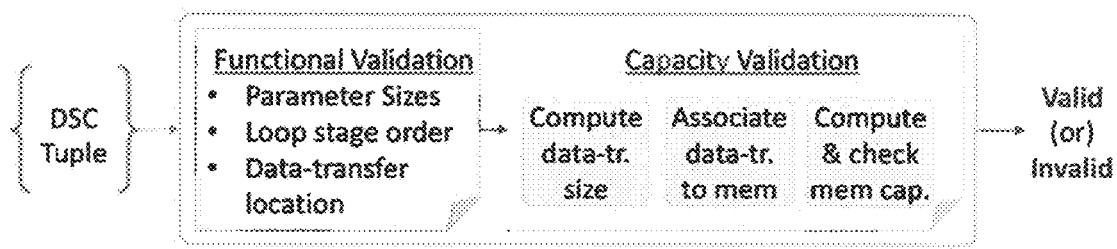
FIG. 7 exemplarily depicts steps in validating a design space configuration (DSC)

In Step 102, sub-steps involved in validating a given DSC tuple in shown in FIG. 7. The first step is functional validation, where, in Step 102, it is identified if the configuration functionally realizes all computations corresponding the layer. The second is capacity validation, where it is identified if the configuration meets the capacity requirements of all memory elements in the system.

In the functional validation, for a DSC configuration to be functionally correct, the following conditions should be satisfied:
 (1) The data-staging parameters should grow progressively larger as we move from the PE array to the external memory i.e., $P \geq T \geq B \geq D \geq N$;
 (2) the loop stages ((T/P), (B/T), and (D/B)) should appear in order and permutation of loops within each stage is allowed;
 (3) similarly, as the analysis moves from the innermost loop, the data-transfers should be ordered such that data is written into a memory before it is read out i.e., for each {Inp, Out, Ker} data-transfer, the P-level transfer happens at the same loop level or below the corresponding T-level transfer, and T-transfer below B-transfer, and so on; and
 (4) Finally, if a data-transfer is streaming, then it should occur at the same loop level as its non-streaming child. This is because streaming transfers should not be stored at a memory level, but are rather streamed past it to the next level. Hence, the memory-level below it should have a corresponding data-transfer at the same loop level and of the same size to receive the data being streamed.

Next, for "capacity validation", in which once the configuration is functionally validated, next computed is the amount of data stored in each memory element. To this end, Step 102 first computes the size of each data-transfer. Given the loop stage where the data-transfer is located, Step 102 starts with a base size of the transfer as the product of the associated dimensions of the child stage. For example, if an Inp transfer is located in the (B/T) loop stage, then the base size equals $T$ in$\times T$ ij$\times T$ mb. Then for every loop in the stage below the data-transfer, the data-transfer size is multiplied by the loop count if the loop corresponds to an associated dimension. From the previous example, if the Inp transfer was located above the (B/T)in and (B/T)kij loops, then the size is multiplied only by the (B/T)in loop count. Effectively, the size of the data-transfer becomes Bin$\times T$ ij$\times T$ mb. It is noteworthy that, as kij does not influence the size of the Inp data-transfer, the data reuse of Inp increases by a factor equal to the (B/T)kij loop count i.e., for the same size of the Inp data-transfer, the invention is able to squeeze in more compute operations.

Once the size of each data-transfer is computed, Step 102 then associates each data-transfer with a memory element. Note that, in the invention, each memory-level (L1, L2 etc.) may include multiple memory structures. The association between memory elements and data-structures can be provided as an optional input to the invention, along with architecture description. If not, for a given memory hierarchy level, then each memory element is assumed that it can store any data-structure and ensure the capacity constraints are cumulatively met at that level. Further, streaming data-transfers are not associated with any memory element, as they are never stored. Along similar lines, in Step 102, double the sizes of the double-buffered transfers, as data needs to be stored in for the next iteration, while the current iteration is under progress.

After all data-transfers are assigned one or more memories, the capacity requirement of each memory element is computed by adding the sizes of the data-transfers that are stored in it. If it is found that the actual capacity exceeds the required capacity for all memories, then the configuration is deemed valid.

In the invention, waveform-based approach is adopted to estimate the performance (and core utilization) for a given DSC. The steps involved in timing a DSC tuple using the example shown in FIGS. 8(a)-8(d). Considering a typical architecture (FIG. 8(a)) with a single core and 2 levels of memory, the program executed by the core is shown in FIG. 8(b). The program contains t levels of nested loops, 6 data-transfers—2 transfers each for Inp, Out and Ker data-structures, and a computing function within its innermost loop. The type of each data-transfer, and the architectural links used to carry-out the transfers are tabulated in FIG. 8(c). At the P level, the P Inp and POut transfers are streamed into the PE array in conjunction with the compute, while PKer is block-loaded at the end of each lc1 loop iteration. At the T level, the T Inp and T Out transfers are double-buffered in separate memories, but share the same link (Lk3) from the last memory-level.

To compute the number of execution cycles, Step 102 may construct a timing waveform for the DSC as shown in FIG. 8(d). To this end, all data-transfers and the compute function are grouped into multiple data-transfer groups. All but one data-transfer in a group are streaming, and the non-streaming data-transfer being the end-point of the streaming chain. This grouping may be useful as streaming transfers and their non-streaming endpoints occur concurrently and hence they need to be timed together. In this example, four data-transfer groups are formed viz. {compute, P Inp, POut}, {PKer, TKer}, {T Inp}, and {T Out}.

For a "Timing Compute Function", each data-transfer group, starting with the computing function whose execution cycles (P_exCycles=f(P {in, op, ij, kij, mb}) is evaluated and repeated as many times as the product of all loop counts. Note that, in FIG. 8(d), the streaming transfers in the group (P Inp, POut) are placed for the same duration as the compute in their corresponding links (lk1 and lk2). If the bandwidth of the link(s) is insufficient to complete the data-transfer(s), then the compute is stretched to account for the data-transfer time.

For "Timing Block-loaded Data-transfer Groups", after the compute function, Step 102 times the block-loaded data-transfer groups. Block-loaded transfers cannot be overlapped with computing, and therefore the computing iterations are split at the loop where the block-loaded transfer is located and an appropriate amount of data-transfer time is inserted. Typically, the data-transfer time is determined by the slowest link in the group. In our example, since PKer is located above loop lc1, the computing iterations are split at lc1, and PKer, TKer are placed in their respective links.

For a "Timing Double-buffered Data-transfer Groups", double-buffered transfers need to be overlapped with the compute. Given the size of the double-buffered transfer and its loop location, the amortized size is identified (and data-transfer duration) that needs to be overlapped with each compute iteration. A time window of size equal to the amortized transfer duration is identified, where all the links in the data-transfer group are free. If this time window completely over-laps compute, then the data-transfers are located in the links. If not, it is attempted to overlap part of the data-transfer with compute and the rest with other block-loaded (or double-buffered) data-transfers, provided their links are mutually exclusive. If this is not possible, idle cycles are introduced in the compute iterations to complete the data-transfer, rendering the DSC tuple memory bound. In FIG. 8(d), the T Inp transfer is completely overlapped with compute, while the T Out transfer introduces idle cycles in each compute iteration.

Once the data-transfers are timed, the total execution cycles can be computed as the sum of product of each compute/idle period in the timing waveform and the number of loop iterations for which they reoccur. Also, each data-structure should be loaded once up to the PE array before the compute iterations can begin. This startup cost is included to the overall execution cycle count. Note that the time for other auxiliary computations such as the activation function etc. are also included. An ideal execution cycles is computed from the number of scalar operations constituting the workload (Nin×Nop×Nij×NKij×Nmb) and the number of scalar processing elements in the architecture. Finally, utilization is computed as the ratio of ideal vs. actual execution cycles.

In Step 103, the space to identify a configuration of the possible configuration that maximizes the metric-of-interest is searched. Thus, given the DSC parameters and a methodology to evaluate DSC tuples, Step 103 includes selecting the DSC tuples for each step (FP/BP/WG) of all layers that yields the best overall DNN performance while meeting the capacity and bandwidth constraints. To this end, FIG. 9 outlines the methodology used in the invention and Step 103 to explore the design space.

Figure 9:
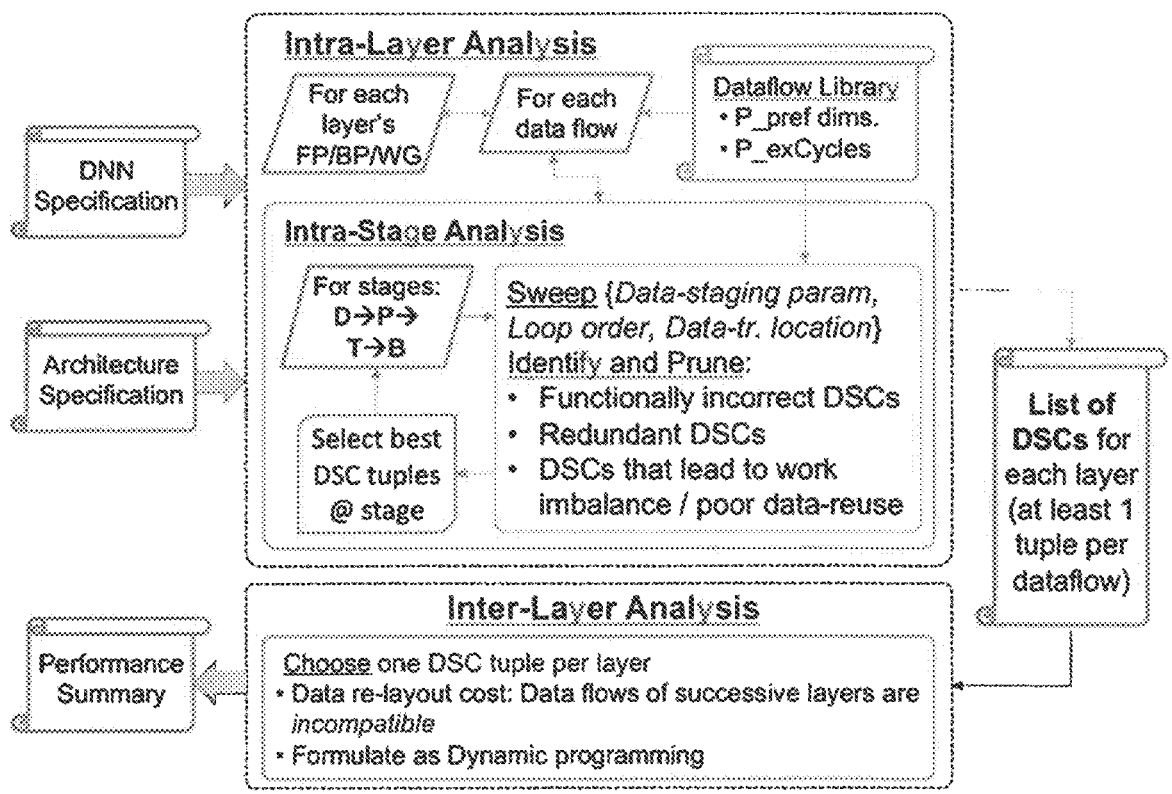
FIG. 9 exemplarily depicts design space exploration.

FIG. 9 includes, for example, two key components:
(1) Intra-layer analysis, in which, for each layer in the network, one sweeps through DSC tuples to identify those that yield the best layer-level performance; and
(2) Inter-layer analysis, in which one DSC tuple per layer is selected, considering the interactions between successive layer configurations, so that the network-level performance is maximized.

For the "Intra-layer Analysis", parameter ranges are considered. That is, the first step in intra-layer analysis is to quantify the size of the design space by identifying the ranges for each parameter. The P, T, B, D{in, op, ij, kij, mb} can take any value between 1 to N{in, op, ij, kij, mb} in their respective dimensions. The (T/P), (B/T) and (D/B) loops can be arranged in 15! ways, and the P, T, B, X<Inp, Out, Ker>s data transfers can be located at 1512 distinct positions. Finally, the above exploration may be repeated for each dataflow (NDF) supported by the architecture. Therefore, the total size of the design space amounts to (NDF)×(15!)× (1512)×(Nin×Nop×Nij×Nkij×Nmb)4. Clearly an exhaustive search of this space is infeasible even for small values of N. Therefore, it is proposed a systematic method to eliminate undesirable choices and prune among the valid choices at each step of the exploration to be able to search the design space in a reasonable time.

As shown in FIG. 9, for each layer, at the topmost level, the invention may iterate through each data-flow supported by the architecture. To ensure correct functionality, the data-staging parameters need to be progressively grow larger in size (P>T>B>D), the loop stages should be placed in order ((T/P)<(B/T)<(D/B)). To enforce these conditions, the design space is explored stage-wise i.e., parameters are explored for one stage at a time, and carry only the best configurations forward to the next stage and subsequently explore further configurations on top.

In the "D Stage Analysis, the work allocated to each core is identified. It is explored all combinations of D{in, op, ij, kij, mb} parameters, except for those that would result in an imbalance of work and/or leave some of the cores unoccupied. This can be identified as for the work to be balanced across all cores, the product of N/D ratios along all dimensions should equal Ncores. The values chosen for the D parameters enforce an upper bound on the P/T/B parameters, which are hither to unidentified.

Next, in "P Stage Analysis", and as described in Step 102, the dataflow specifies Ppref, the minimum value for P required to keep the PE array at its peak utilization. To provide maximum flexibility for the other stages, the value for P is chosen to be the minimum of D or Ppref along each dimension.

In "B/T Stage Analysis", analysis for the T and B stages may be identical. Therefore, the analysis is explained only in the context of the T stage. Before exploring the T{op, ij, kij, mb} data-staging parameters, it is first iterated over possible loop orders and data-transfer locations. To this end, for each permutation of the (T/P) loop order, valid positions are identified to locate each non-streaming data-transfer i.e., loops above which if the data-transfer is placed, it would lead to a hither to unexplored data-transfer size. Since each data-transfer is dependent only on 3 of the 5 dimensions, they can be placed at most at 3 different loop locations. Except in the last stage, for each data-transfer is allowed to be free, i.e., to be not assigned to any loop at this stage. Further, the ordering constraint on data-transfers is enforced i.e., T transfers cannot be located below P transfers and so on. Streaming data-transfers should be located at the same loop as their non-streaming child, and hence no exploration is required in their context.

For a given loop order permutation and data-transfer location, possible values for the T{in, op, ij, kij, mb} data-staging parameters are explored. The P and D parameters set the lower and upper bounds for T. The exploration is limited to values of T that ensure almost equal distribution of work amongst loops. For example, an ideal value of T should both be a multiple of P and a divisor of D. Also, to further reduce the number of combinations explored, boundary combinations are identified that violate capacity constraints, and explore only those that fall within the boundary.

At end of each stage, a fixed number of DSC tuples are selected that yield the best stage-level utilization, and the parameters of the next stage are explored only for those tuples. Finally, after all the stages have been explored, one DSC tuple per data-flow is selected and produced as the output of intra-layer analysis.

Next, in the "Inter-layer Analysis", from the set of DSC tuples available for each layer, the inter-layer analysis picks one DSC per layer which maximizes the overall network-level performance.

Figure 10:
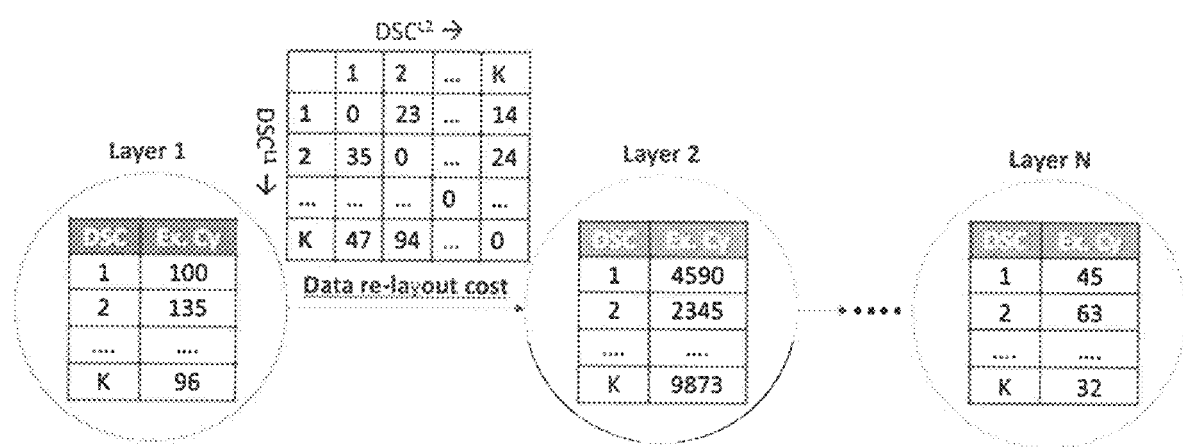
FIG. 10 exemplarily depicts an inter-layer analysis formulation.

A problem of choosing the DSC tuple using dynamic programming is formulated, as shown in FIG. 10. Considering a DNN with N layers represented as graph, the nodes represent the layers, each with K DSCs corresponding to different dataflows and associated execution cycles. The edges are associated with a cost table—C(DSC1, DSC2)—that indicates the overhead cycles for managing the data layout, when a pair of DSCs are chosen for the vertices (layers) connected by the edge. The problem of inter-layer performance estimation is formulated as follows:

Let Per f($L_{N-1}$, $DSCL^{N-1}$) denote the optimal performance up to layer $L_{N-1}$, when the layer's choice is $DSCL^{N-1}$. The optimal performance including the last layer LN can be written per Equation (1):

$$\text{Per } f(L_N, DSC_j^{LN}) = \text{Min}\{\text{Per } f(L_N-1, DSC_i^{LN-1}) + ExCy(DSC_j^{LN}) + C(DSC_i^{LN-1}, DSC_j^{LN})\} \forall i \in DSCs \text{ of } L_{N-1} \text{ and } \forall j \in DSCs \text{ of } L_N \quad (1)$$

With the above formulation, an optimal network-level execution time estimation can be computed in O(NK2). Thus, Step 103 efficiently explores the space of design space configurations to identify DSC tuples for each layer, such that an overall DNN performance is maximized.

Thereby, in Steps 101-103, "Design Space Characterization" can be performed, in which the invention systematically characterize the space of possible mapping configurations and identifies the key design space parameters. "Configuration Estimation" also can be performed, in which given a parameter configuration, the invention estimates the performance/utilization of the processing cores, capacity requirement for each memory element, band-width for each link. Lastly, "Design Space Exploration" can be performed, in which we develop design space pruning strategies are developed to explore the space of possible configurations and identify the configuration that yields the best utilization while meeting hardware constraints.

Embodiments of the invention can be utilized to identify the best configuration for the different convolution layers of the popular VGG DNN. A total of >1 million configurations can be swept for each layer to identify these configurations in under 30 minutes. The configurations identified automatically by the proposed methods can be checked to see if they reflect the intrinsic computational characteristics of each layer. At the top level, the D parameters, which split work spatially amongst cores, reveal that the initial layers, "conv1_1" through "conv2_2", with large feature sizes prefer division in the "ij" dimension. On the other hand, layers "conv3_1" through "conv5_2" have abundant input and output features, and prefer division in the "in" and "op" dimensions. Also, since the feature sizes of "conv5_1" and "conv5_2" are very small, multiple "mb" inputs are batched to the same core (Dmb >1) to enhance reuse of kernel weights.

The order in which the loops are arranged, and the points where the data-transfers are located affect the overall performance and capacity/bandwidth requirements. For example, in "conv4_2" for the chosen DSC the "Inp" transfer in the (B/T) loop stage (BInp) is above all the (B/T) loops making the effective data transfer size to be X inp. Furthermore, the data reuse of I np increases by a factor of (B/T)kij*(B/T)op loop count. In addition, there is an increase in the reuse for "Ker" transfer in the (T/P) loop stage (TKer) with the transfer located above all the (T/P) loops contributing to increase in the PE utilization. In contrast, for "conv1_1" layer with large feature sizes, the "Inp" transfers are below the (B/T)ij loop to meet the capacity constraints thereby reducing the reuse and making the execution bandwidth-limited, and memory-bound.

Embodiments of the inventions can be utilized to study the sensitivity of performance to on-chip storage capacity and off-chip bandwidth for the different layers of VGG. The proposed embodiments can exploit the increase in on-chip capacity to derive DSCs with data transfers staged to improve their reuse, thereby leading to commensurate improvements in utilization. The increase in capacity can be useful for the later layers ("conv3_1" to "conv5_2") as they are predominantly compute-bound even at a lower bandwidth. Also, the initial layers can be more sensitive to increase in bandwidth compared to the final layers. This can be directly attributed to their memory-bound nature. The layers can be more sensitive to bandwidth, when the on-chip capacity is smaller. This is because, if the on-chip capacity is small, the opportunity for data reuse decreases, and makes the need for a larger bandwidth more critical.

Accordingly, to improve the computing efficiency of DNNs, various accelerator architectures and associated dataflows have been proposed. However, a quick-yet-systematic approach to map DNNs onto any given accelerator architecture, considering the heterogeneous characteristics of the different DNN layers, and hardware constraints imposed by the architecture remains an open challenge not solved by conventional techniques. Embodiments of the invention include a systematic framework to analyze DNNs on shared memory accelerator systems. Given a description of the DNN and the hardware architecture, embodiments of the invention may systematically explore the space of possible data and compute partitioning configurations and identify a configuration for each layer (FP/BP/WG) that maximizes the overall performance.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 11, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 12:
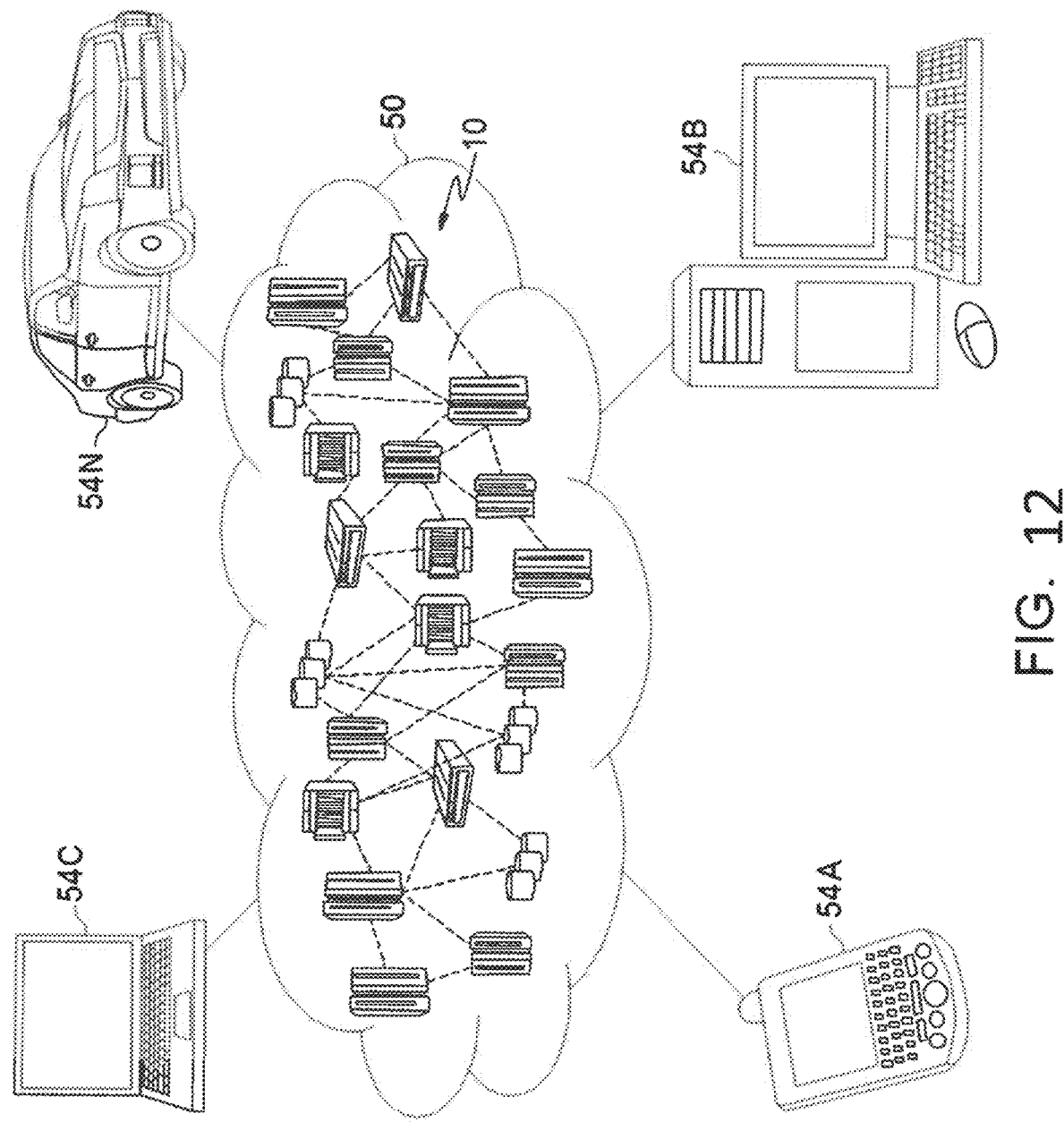
FIG. 12 depicts a cloud-computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Figure 13:
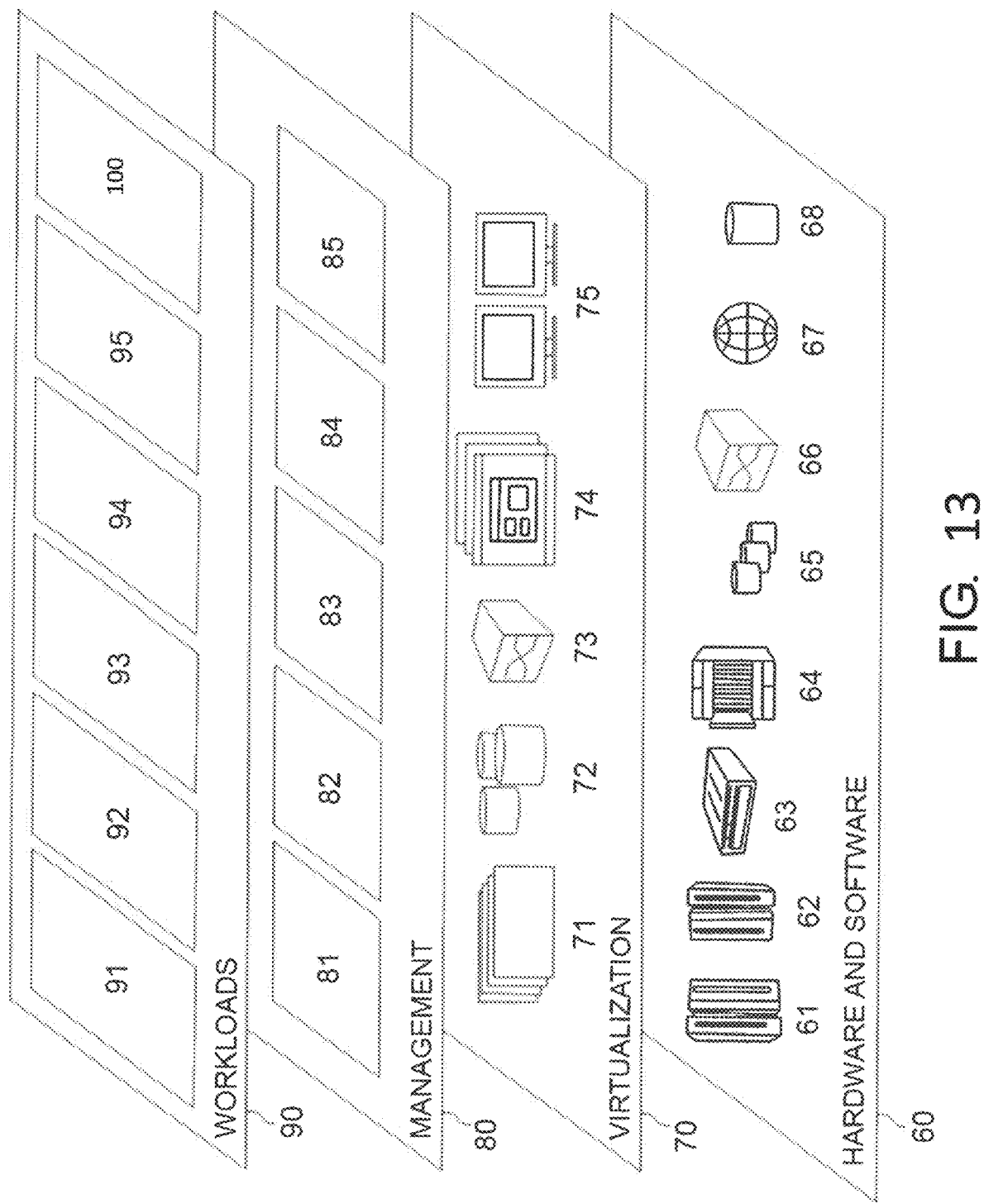
FIG. 13 depicts abstraction model layers according to an embodiment of the present invention.

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Deep Neural Networks analysis method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart, and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented Deep Neural Networks analysis method, the method comprising:
    characterizing a space of possible configurations for a deep neural network (DNN);
    evaluating a metric-of-interest for a configuration of the possible configurations; and
    searching the space to identify a configuration of the possible configurations that maximizes the metric-of-interest, wherein, the searching performs an intra-layer analysis, in which, for each layer in the deep neural network (DNN), sweeps through design space configuration (DSC) tuples are done to identify which that maximizes the metric-of-interest, the sweeps in the intra-layer analysis including:
  determining combinations of the configurations that maximizes the metric-of-interest by pruning parameters of the DNN to choose combinations that lead to balance in a work across cores;
  selecting a loop order and a data-transfer location that maximizes data reuse; and
  identifying redundant configurations to sweep only once,
wherein idle cycles are introduced in compute iterations to complete a data-transfer, rendering the DSC tuples memory bound, and
wherein the space of possible configurations comprises a workload associated with each step of a given layer that is represented using a multi-dimensional tuple N and involves three different data-structures.

2. The computer-implemented method of claim 1, wherein the characterizing characterizes the space based on an input description of the DNN, and
  wherein the searching performs inter-layer analysis, in which one DSC tuple per layer is selected, considering the interactions between successive layer configurations, so that a network-level performance is maximized, and
  wherein, in the inter-layer analysis, a single combination is selected for each layer while considering a cost of re-laying data.

3. The computer-implemented method of claim 1, wherein the DNN comprises a sequence of convolutional and fully connected layers whose parameters are represented using a tuple in a first form.

4. The computer-implemented method of claim 1, wherein the possible configurations comprise at least one of a computation configuration and a data-partitioning configuration.

5. The computer-implemented method of claim 1, wherein the evaluating evaluates the metric-of-interest based on a predetermined hardware specification.

6. The computer-implemented method of claim 5, wherein the predetermined hardware specification comprises:
  a plurality of processor cores;
  a plurality of memory elements; and
  a plurality of data-links.

7. The computer-implemented method of claim 6, further comprising periodically sending control information and receiving status updates to and from the plurality of processor cores and a memory enabling the system to realize all computations in the DNN.

8. The computer-implemented method of claim 1, embodied in a cloud-computing environment.

9. The computer-implemented method of claim 1, wherein, an attempt is made to overlap part of the data-transfer with compute and a rest with other block-loaded data-transfers, provided links are mutually exclusive therebetween, and
  wherein, if the attempt is not possible, the idle cycles are introduced.

10. The computer-implemented method of claim 1, wherein the data-transfer comprises one of:
  a double-buffered transfer in which the data-transfer prefetches data for a next computing iteration, over-lapping communication with computing;
  a streaming transfer in which the data-transfer occurs synchronously at a same time as the computing is progressing; and
  a block-load transfer in which the compute idles while the data-transfer occurs.

11. A computer program product for Deep Neural Networks analysis, the computer program product comprising a computer-readable storage medium having program instructions embodied therewith, the program instructions executable by a computer to cause the computer to perform:
  characterizing a space of possible configurations for a deep neural network (DNN);
  evaluating a metric-of-interest for a configuration of the possible configurations; and
  searching the space to identify a configuration of the possible configurations that maximizes the metric-of-interest,
wherein, the searching performs an intra-layer analysis, in which, for each layer in the deep neural network (DNN), sweeps through design space configuration (DSC) tuples are done to identify which that maximizes the metric-of-interest, the sweeps in the intra-layer analysis including:
  determining combinations of the configurations that maximizes the metric-of-interest by pruning parameters of the DNN to choose combinations that lead to balance in a work across cores;
  selecting a loop order and a data-transfer location that maximizes data reuse; and
  identifying redundant configurations to sweep only once,
wherein idle cycles are introduced in compute iterations to complete a data-transfer, rendering the DSC tuples memory bound, and
wherein the space of possible configurations comprises a workload associated with each step of a given layer that is represented using a multi-dimensional tuple N and involves three different data-structures.

12. The computer program product of claim 11, wherein the characterizing characterizes the space based on an input description of the DNN.

13. The computer program product of claim 11, wherein the DNN comprises a sequence of convolutional and fully connected layers whose parameters are represented using a tuple in a first form.

14. The computer program product of claim 11, wherein the possible configurations comprise at least one of a computation configuration and a data-partitioning configuration.

15. The computer program product of claim 11, wherein the evaluating evaluates the metric-of-interest based on a predetermined hardware specification.

16. The computer program product of claim 15, wherein the predetermined hardware specification comprises:
  a plurality of processor cores;
  a plurality of memory elements; and
  a plurality of data-links.

17. The computer program product of claim 16, wherein the computer program product further stores instructions to cause the computer to perform:
  periodically sending control information and receiving status updates to and from the cores and a memory enabling the system to realize all computations in the DNN.

18. A Deep Neural Networks analysis system, said system comprising:
- a processor; and
- a memory, the memory storing instructions to cause the processor to perform:
  - characterizing a space of possible configurations for a deep neural network (DNN);
  - evaluating a metric-of-interest for a configuration of the possible configurations; and
  - searching the space to identify a configuration of the possible configurations that maximizes the metric-of-interest,
- wherein, the searching performs an intra-layer analysis, in which, for each layer in the deep neural network (DNN), sweeps through design space configuration (DSC) tuples are done to identify which that maximizes the metric-of-interest, the sweeps in the intra-layer analysis including:
  - determining combinations of the configurations that maximizes the metric-of-interest by pruning parameters of the DNN to choose combinations that lead to balance in a work across cores;
  - selecting a loop order and a data-transfer location that maximizes data reuse; and
  - identifying redundant configurations to sweep only once,
- wherein idle cycles are introduced in compute iterations to complete a data-transfer, rendering the DSC tuples memory bound, and
- wherein the space of possible configurations comprises a workload associated with each step of a given layer that is represented using a multi-dimensional tuple N and involves three different data-structures.

19. The system of claim 18, wherein the characterizing characterizes the space based on an input description of the DNN.

20. The system of claim 18, embodied in a cloud-computing environment.

* * * * *